United States Patent [19]
Fukuoka

[11] 3,819,986
[45] June 25, 1974

[54] EXCESS VOLTAGE PROTECTING CIRCUIT
[75] Inventor: Toshimi Fukuoka, Tokyo, Japan
[73] Assignee: Sony Corporation, Tokyo, Japan
[22] Filed: Apr. 10, 1973
[21] Appl. No.: 349,728

[30] Foreign Application Priority Data
Apr. 14, 1972  Japan.......................... 47-44030[U]

[52] U.S. Cl......... 317/16, 178/DIG. 11, 317/33 VR, 323/8, 323/9, 323/22 T, 323/DIG. 1
[51] Int. Cl............................................... G05f 1/58
[58] Field of Search................. 178/7.3 R, DIG. 11; 317/16, 33 VR; 323/8, 9, 17, 22 T, DIG. 1

[56] References Cited
UNITED STATES PATENTS

| | | | |
|---|---|---|---|
| 3,437,905 | 4/1969 | Healey et al. | 323/22 T |
| 3,445,751 | 5/1969 | Easter | 323/22 T |
| 3,512,044 | 5/1970 | Jones | 323/9 X |
| 3,527,997 | 9/1970 | Nercessian | 323/9 |
| 3,641,361 | 2/1972 | Limberg et al. | 178/7.3 R |
| 3,700,959 | 10/1972 | Sakurai | 178/7.3 R |

Primary Examiner—A. D. Pellinen
Attorney, Agent, or Firm—Lewis H. Eslinger, Esq.; Alvin Sinderbrand, Esq.

[57] ABSTRACT

An excess voltage protecting circuit for use with an automatic voltage regulating circuit of the type which has a circuit breaker, fuse or the like connected in series between the automatic voltage regulating circuit and the power supply to be regulated, the excess voltage protecting circuit including means for detecting the output voltage from the voltage regulating circuit for producing a first control signal for the voltage regulating circuit and a second control signal, and a shunt circuit responsive to the second control signal which operates to trip the current breaking device when the voltage output from the voltage regulating circuit exceeds a predetermined level.

7 Claims, 3 Drawing Figures

3,819,986

EXCESS VOLTAGE PROTECTING CIRCUIT

BACKGROUND OF THE INVENTION

The invention relates generally to voltage regulated power supplies and more particularly to an excess voltage protecting circuit for use with such power supplies.

In a conventional series-type automatic voltage regulating circuit, for example in the type where a transistor is connected in series between the power supply and an output terminal, there is the disadvantage that if the transistor is short-circuited due to trouble in its driving circuit or because of the destruction of the element itself, the input voltage from the power supply is applied directly to the load circuit which may result in the destruction of load circuit elements.

SUMMARY OF THE INVENTION

This disadvantage of the prior art circuits is overcome by the present invention of an excess voltage protecting circuit for use with a voltage regulating circuit of the type which is connected in series with a current breaking device between the output of a power supply and an output terminal, the excess voltage protecting circuit comprising means for detecting the output voltage of the output terminal with respect to a reference voltage to produce a control voltage and shunt means connected between the circuit ground and the series connection of the voltage regulating circuit and the current breaking device for shunting excess voltage from the power supply when the control voltage exceeds a predetermined value.

In one preferred embodiment of the invention the voltage regulating means includes a potentiometer connected between the output terminal and the circuit ground, a reference voltage source, a first transistor having a control electrode and first and second electrodes, and means connected in series with the current breaking device and the output terminal for varying the flow of current therebetween in response to voltages supplied to the input terminal to the current varying means, the control electrode of the first transistor being connected to the sliding contact of the potentiometer, the first electrode being connected to the voltage reference source and the second electrode being connected to the input to the current varying means. The output voltage detecting means includes a second transistor having a control electrode and first and second electrodes, the first electrode of the second transistor being connected to the sliding contact of the potentiometer, the control electrode of the second transistor being connected to the voltage reference source and the second electrode of the second transistor being connected to the current shunt means.

In one embodiment the voltage regulating means includes a transistor connected in series between the current breaking device and the output terminal. The series connected transistor is operated in a switching mode by the output signal from a pulse width modulating circuit whose input is connected to the second electrode of the first transistor. In another embodiment the control electrode of the series connected transistor is connected directly to the second electrode of the first transistor so that the series connected transistor is operated in a current amplifier configuration.

In all of the embodiments the shunt circuit includes a high current carrying semiconductor switching device such as a silicon controlled rectifier or a gate controlled switch. The anode and cathode terminals of the semiconductor switching device are connected between the circuit ground and the series connection of the voltage regulating circuit and the current breaking device. The gate electrode of the semiconductor switching device is connected to the second electrode of the second transistor. In one preferred embodiment the shunt circuit comprises the horizontal output switching element of a television receiver.

It is therefore an object of the present invention to provide an excess voltage protecting circuit for preventing the destruction of circuit elements connected to an automatically regulated power supply.

It is another object of the invention to provide an excess voltage sensing circuit for use in a voltage regulated power supply, which sensing circuit is connected as part of the voltage regulating function of the power supply.

It is still another object of the present invention to provide an excess voltage protecting circuit for use with the horizontal output circuit of a television receiver.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
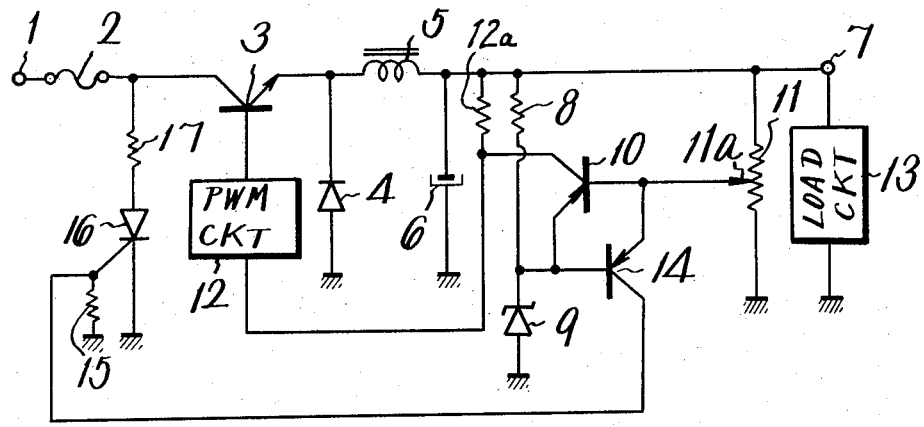
FIG. 1 is a schematic circuit diagram of an excess voltage protecting circuit in accordance with one embodiment of the invention.

Referring now more particularly to FIG. 1 an automatic voltage regulating circuit of the series switching type is illustrated. Input terminal 1 is connected to the output of a power supply (not shown). Terminal 1 is connected through a current breaking device, such as a fuse 2 to the collector electrode of a switching transistor 3. The emitter electrode of transistor 3 is connected through a choke 5 to an output terminal 7. The cathode of a diode 4 is connected to the emitter electrode of the transistor 3 and its anode is connected to the circuit ground. A capacitor 6 is connected between the output terminal 7 and the circuit ground. The choke 5 and the capacitor 6 form a low-pass filter. The base of the transistor 3 is connected to the output of a pulse width modulating circuit (PWM) 12. The input to the PWM circuit 12 is connected through a resistor 12a to the output terminal 7. A resistor 8 is connected between the output terminal 7 and the cathode terminal of a zener diode 9 whose anode is connected to the circuit ground. The cathode terminal of the zener diode 9 provides a voltage reference source.

A potentiometer 11 is connected between the terminal 7 and the circuit ground and in parallel with a load circuit 13. The sliding contact 11a of the potentiometer 11 is connected to the base electrode of a first PNP transistor 10. The collector electrode of the transistor 10 is connected to an input of the PWM circuit 12. The emitter electrode of the transistor 10 is connected to the cathode of the zener diode 9. A second PNP transistor 14 has its emitter electrode connected to the sliding contact 11a and its base electrode connected to the cathode of the zener diode 9.

The collector electrode of the transistor 14 is connected to the gate electrode of an SCR 16. The gate electrode of the SCR 16 is also connected to the circuit ground through a resistor 15. The anode of the SCR 16 is connected through a resistor 17 to the collector electrode of the transistor 3.

In operation, a voltage signal derived at the sliding contact 11a of the potentiometer 11 is supplied to the base electrode of the transistor 10. An error signal representative of the difference between the derived signal and the reference voltage at the cathode of the zener diode 9 is thus produced at the collector electrode of the transistor 10. This error signal is supplied to the input terminal of the PWM circuit 12 to regulate the pulse width of a driving signal produced at the output of the PWM circuit 12. The driving signal is supplied to the base electrode of the transistor 13 to control its duty cycle.

When the voltage of the error signal increases the pulse width of the driving signal becomes narrower. This results in reducing the period of time during which the switching transistor 3 is conductive and thus reduces the output voltage at the terminal 7. The reverse operation takes place when the voltage at the output terminal 7 decreases.

The DC voltage obtained at the output terminal 7 is adjusted in level by varying the position of the sliding contact 11a of the potentiometer 11. Thus when the sliding contact 11a is moved in the direction of the connection to the output terminal 7 the collector voltage of the transistor 10 increases and the pulse width of the driving signal to the base transistor 3 is narrowed, thereby reducing the output voltage obtained at the output terminal 7. In a reverse manner, when the sliding contact 11a is moved toward the circuit ground side of the potentiometer 11 the DC output voltage at terminal 7 increases.

With the exception of the transistor 14, the SCR 16 and the resistors 15 and 17, the above described circuit is similar to prior art circuits of this type. Such circuits suffer from the disadvantage that if the transistor 3 becomes shorted between its collector and emitter electrodes due to trouble in the PWM circuit 12 or because of the destruction of the transistor 3 itself the input voltage of approximately 300 volts, for example, as compared with a nominal output voltage of 100 volts, is applied to the load circuit 13, thereby damaging load circuit elements such as transistors, diodes, etc.

In the present invention, this disadvantage is overcome in the following manner. When the voltage obtained at the sliding contact 11a is less than the reference voltage at the cathode of the zener diode 9, the transistor 14 is nonconductive so that no voltage is produced across the resistor 15 and the SCR 16 is not turned on. When the voltage at the sliding contact 11a becomes greater than the reference voltage at the zener diode 9, the sensing transistor 14 becomes conductive and a voltage is produced across the resistor 15 to make the SCR 16 conductive. In its conductive state the SCR 16 shunts a large current flow from the series circuit of the fuse 2 and the transistor 3 to the circuit ground with the result that the fuse 2 is blown and the load circuit 13 is thereby prevented from being destroyed by the excess voltage.

Since the potentiometer 11 is employed in common as the output voltage adjusting means of the automatic voltage regulating circuit and also as the excess voltage sensing means the circuit has the following advantage. When the DC voltage of the output terminal 7 is increased by moving the sliding contact 11a in the direction of the circuit ground side of the potentiometer 11 the voltage obtained at the sliding contact 11a is decreased. Thus the voltage taken from the sliding contact 11a which is supplied to the emitter electrode of the excess voltage sensing transistor 14 is a smaller proportion of an increased output voltage so that the effect remains substantially as above, namely that when the voltage at the output terminal 7 exceeds the predetermined value set by the zener diode 9 the transistor 14 becomes conductive and causes the SCR 16 to provide a conductive shunt path between the collector electrode of the transistor 3 and the circuit ground.

Figure 2:
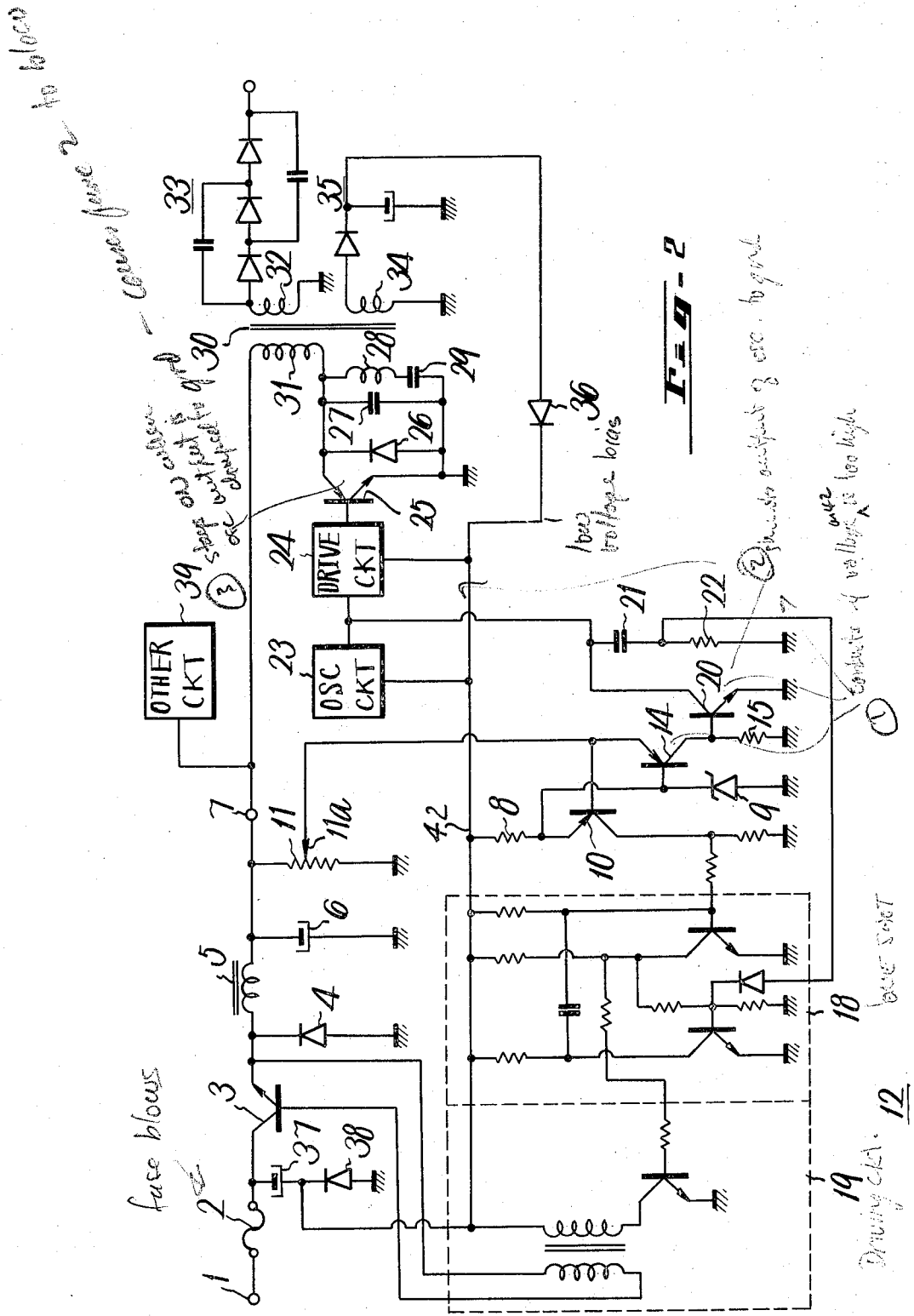
FIG. 2 is a schematic circuit diagram of a second embodiment of the invention for use in the horizontal output section of a television receiver.

Referring now more particularly to FIG. 2 an example of an embodiment of the invention as adapted for use in a horizontal output circuit of a television receiver is illustrated. The same elements of the embodiment of FIG. 1 are given the same reference numerals in the embodiment of FIG. 2. Connected to the output terminal 7 are other (load) circuits designated by the numeral 39 and one lead of a primary winding 31 of a flyback transformer 30. The other lead of the primary winding 31 is connected to the anode of a gate controlled switch (GCS) 25. The cathode of the GCS 25 is connected to the circuit ground. A damper diode 26 is connected at its anode to the circuit ground and at its cathode to the anode of the GCS 25. A capacitor 27 is connected in parallel with the damper diode 26. A series connection of a deflection coil 28 and a capacitor 29 is connected in parallel with the capacitor 27.

The secondary winding 32 of the flyback transformer 30 has one lead connected to the circuit ground and another lead connected to a high voltage rectifying circuit generally designated 33. The tertiary winding 34 is connected by one lead to the circuit ground and by its other lead to a low voltage rectifying circuit designated generally 35. The output of the rectifying circuit 35 is connected through a reverse current protecting diode 36 to a voltage bias lead 42 which supplies the low voltage DC bias for multivibrator circuit 18, a driving circuit 19, an oscillating circuit 23 and a drive circuit 24. The DC voltage for the lead 42 is derived from the tertiary winding 34 of the FBT 30 rather than directly from the output terminal 7 in order to decrease the consumption of power.

The gate electrode of the GCS 25 is connected to the output of the drive circuit 24 whose input is derived from the output of the oscillator circuit 23. The output of the oscillator circuit 23 is connected to the circuit ground through a series connection of a capacitor 21 and a resistor 22 and is also applied to the collector electrode of an NPN transistor 20 whose emitter is connected to the circuit ground. The base electrode of the transistor 20 is connected to the circuit ground through a resistor 15 and is connected directly to the collector electrode of the PNP transistor 14. The emitter electrode of the transistor 14 is connected to the base of the transistor 10 and to the sliding contact 11a. The base electrode of the transistor 14 is connected to the anode of the zener diode 9 and to the emitter electrode of the transistor 10. The emitter electrode of the transistor 10 is connected to the bias lead 42 through the resistor 8.

The collector electrode of the transistor 10 is connected to the input of a one shot multivibrator, designated generally 18, whose output is connected to the input of a driving circuit 19. The output of the driving circuit 19 is applied between the base and emitter electrodes of the transistor 3.

The capacitor 21 and the resistor 22 form a differentiating circuit which differentiates the output of the oscillator circuit 23 to provide a trigger signal to a second input of the one shot multivibrator 18. The input to the one shot multivibrator 18 from the collector of the transistor 10 controls the pulse width of the driving signal supplied to the circuit 19.

A capacitor 37 is connected between the collector electrode of the transistor 3 and the cathode electrode of a diode 38. The anode electrode of the diode 38 is connected to the circuit ground. The cathode electrode of the diode 38 is also connected to the low voltage DC bias lead 42. In operation, when the television receiver is first turned on and power is supplied to the input terminal 1 the flyback transformer 30 is supplied with no voltage since the transistor 3 is initially nonconductive. Therefore no low voltage DC is supplied from the rectifying circuit 35 to the bias lead 42 to power the circuits 18 and 19 which would otherwise cause the transistor 3 to become conductive. In order to avoid this problem, the consenser 37 is added to conduct an initial pulse of voltage to the bias lead 42 which causes the circuit 18 and 19 to make the transistor 3 briefly conductive. Once the transistor 3 conducts, the flyback transformer and the low voltage rectifying circuit 35 continue to supply low voltage DC to the lead 42 and the system becomes operational. The diode 38 discharges the capacitor 37 when the television receiver is turned off. In terms of the automatic voltage regulating provisions of the circuit, it operates in substantially the same manner as described above with reference to FIG. 1. In terms of protecting against an excess voltage this system operates in the following manner.

When the DC voltage at the output terminal 7 is less than the predetermined excess voltage the transistor 14 is made nonconductive and hence the transistor 20 becomes nonconductive. Therefore the output signal from the oscillator 23, differentiated by the resistor 22 and the capacitor 21, is supplied to operate the one shot multivibrator 18 as described above. If, however, the DC voltage at the output terminal 7 exceeds the predetermined excess voltage value the transistor 14 becomes conductive, thereby making the transistor 20 conductive to shunt the output of the oscillating circuit 23 to the circuit ground. If the output pulse from the oscillating circuit 23 is designed to be reversed in phase with the conductive and nonconductive condition of the GCS 25, when the output of the oscillating circuit becomes zero the GCS 25 becomes conductive and holds its conductive state. As a result the large current which is caused by the excess voltage flows through a series loop comprised of the input terminal 1, the fuse 2, the transistor 3, the choke 5, the output terminal 7, the primary winding 31 of the FBT 30 and the GCS 25 to the circuit ground to thereby blow the fuse 2 and thus protect the circuit 39 from an overload. Since the transistor 3 and the GCS 25 are only briefly supplied with the large current they are not destroyed. Thus in the embodiment of FIG. 2 the horizontal output switching device (GCS 25) serves a double purpose in that it also acts as the excess voltage shunting device.

Figure 3:
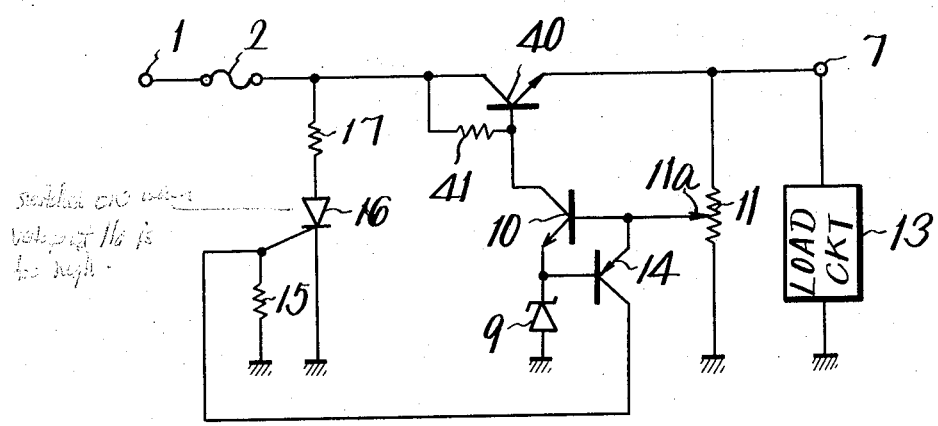
FIG. 3 is a schematic diagram of a third embodiment of the invention.

Referring now more particularly to FIG. 3 an automatic voltage regulating circuit in which the series connected semiconductor device between the input and output terminals operates as a variable resistance element rather than as a switch. In this embodiment the elements of the embodiment of FIG. 1 are designated with the same reference numerals. The fuse 2 is connected in series with the collector-emitter junction of an NPN transistor 40 to the output terminal 7. The base of the transistor 40 is connected to its collector electrode through a resistor 41. The collector electrode of the transistor 10 is connected to the base electrode of the transistor 40. In all other respects the circuit of FIG. 3 corresponds substantially to the circuit of FIG. 1. The method of operation is also substantially the same as the embodiment of FIG. 1 in that the output voltage is sampled at the sliding contact 11a and is supplied through the transistor 10 to control the conductance of the collector-emitter junction of the transistor 40. When an excess voltage appears at the sliding contact 11a the transistor 14 causes the SCR 16 to act as a shunt circuit to divert the excess voltage.

While in the embodiments described above with reference to FIGS. 1 and 3 the device 16 is described as being an SCR it should be apparent to those skilled in the art that a GCS or even an ordinary transistor of sufficient current carrying capacity could replace the SCR. Furthermore it should be understood that in other embodiments the current breaking device is not limited to a fuse but may be, for example, a circuit breaker.

The circuits 12, 18, 19, 23 and 24 have not been described in detail as the designs of such circuits are well known to those skilled in the art.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An excess voltage protecting circuit comprising:
   A. an input terminal;
   B. an output terminal;
   C. a common terminal;
   D. excess current breaking means connected to said input terminal;
   E. voltage regulating means responsive to a control signal and connected to said input terminal;
   F. control signal generating means for producing said control signal and including a first transistor of one conductivity type having first, second and third electrodes;
   G. a reference voltage source;
   H. output voltage detecting means connected between said output terminal and said common terminal
   I. a switching element having a control electrode, said switching element being connected between said common terminal and a junction point of said excess current breaking means and said voltage regulating means;

J. means for connecting said first, second and third electrodes, respectively, of said first transistor to said voltage regulating means, said output voltage detecting means, and said reference voltage source; and K. a second transistor of the opposite conductivity type from said first transistor and having a collector electrode connected to said control electrode of said switching element, a base electrode connected to said reference voltage source, and an emitter-electrode connected to said output voltage detecting means, said second transistor being biased to make said switching element conductive when the voltage derived from said output voltage detecting means exceeds said reference voltage by a predetermined amount.

2. An improved voltage regulating circuit for a power supply as recited in claim 1 wherein, the voltage regulating means comprises a switching regulation circuit of the series type and a pulse width modulating circuit connected to the first electrode of the first transistor for controlling the duty cycle of the switching regulation circuit.

3. An improved voltage regulating circuit for a power supply as recited in claim 1 wherein the switching element is a four-layer semiconductor device having at least anode, cathode and gate electrodes.

4. An improved excess voltage control circuit connected between a pair of input terminals and a pair of output terminals, an external load being connected to said output terminals, wherein the improvement comprises:

A. excess current breaking means connected in series between a first one of said input terminals and a first one of said output terminals;

B. a voltage reference source;

C. output voltage detecting means connected across said output terminals;

D. a deflection circuit comprising:
  1. a semiconductor device comprising current carrying electrodes and at least one control electrode,
  2. a transformer comprising a winding connected in series with said current carrying electrodes to comprise a series circuit connected across said output terminals;

E. oscillatory means to supply actuating pulse signals to said semiconductor device to render such semiconductor device periodically non-conductive;

F. a control transistor of one conductivity type comprising:
  1. a first electrode connected to said voltage reference source,
  2. a second electrode connected to said voltage detecting means, and
  3. a third electrode;

G. connecting means connecting said oscillatory circuit to said deflection circuit; and H. means connecting said control transistor to said connecting means to interrupt the transmission of signals from said oscillatory circuit to said deflection circuit when the voltage at the output of said voltage detecting means exceeds a predetermined magnitude, whereby said semiconductor device remains conductive and actuates said excess current breaking means to interrupt current to said excess voltage control circuit.

5. An improved excess voltage control circuit as defined by claim 4 comprising, in addition:

A. a regulating transistor having an emitter-collector circuit connected in series between said current breaking means and said first output terminal;

B. a second control transistor of the opposite conductivity type from said first-named control transistor and comprising:
  1. a first electrode connected to said voltage detecting means,
  2. a second electrode connected to said voltage reference source, and
  3. a third electrode;

C. pulse generating means connected to said second control transistor, and to said connecting means, whereby the duty cycle of pulses generated by said pulse generating means is controlled by said second control transistor and the timing of said pulses is controlled by said oscillatory means; and D. means connecting the output of said pulse generating means to said regulating transistor to control the conductivity thereof in accordance with said pulses from said pulse generating means.

6. An improved excess voltage control circuit according to claim 5 comprising, in addition:

A. a second winding on said transformer;

B. a rectifying circuit connected to said second winding to produce a direct voltage;

C. direct current circuit means connecting said rectifying means to said oscillatory circuit and to said pulse generating means to supply operating voltage thereto; and D. a capacitor connecting a circuit point between said regulating transistor and the one of said input terminals to which it is connected to said direct current circuit means to supply an initial impulse signal to said direct current circuit means to initiate operation of said oscillatory means, said pulse generating means, and said regulating transistor.

7. An improved voltage regulating circuit for a power supply as recited in claim 4, wherein said means connecting said control transistor to said connecting means comprises a further transistor having first, second and third electrodes connected, respectively, to the oscillatory circuit, the third electrode of the control transistor and the other one of said output terminals.

* * * * *